US012613130B2

(12) United States Patent
Yao et al.

(10) Patent No.: US 12,613,130 B2
(45) Date of Patent: Apr. 28, 2026

(54) PARALLEL SENSING AND DEMODULATION SYSTEMS FOR ACOUSTIC WAVES BASED ON DUAL OPTICAL FREQUENCY COMBS

(71) Applicant: UNIVERSITY OF ELECTRONIC SCIENCE AND TECHNOLOGY OF CHINA, Sichuan (CN)

(72) Inventors: Baicheng Yao, Chengdu (CN); Xinyue He, Chengdu (CN); Bing Chang, Chengdu (CN); Teng Tan, Chengdu (CN); Shangce Wang, Chengdu (CN); Yu Wu, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 105 days.

(21) Appl. No.: 18/774,967

(22) Filed: Jul. 17, 2024

(65) Prior Publication Data

US 2025/0027808 A1 Jan. 23, 2025

(30) Foreign Application Priority Data

Jul. 17, 2023 (CN) .......................... 202310875225.0

(51) Int. Cl.
*G01H 9/00* (2006.01)
(52) U.S. Cl.
CPC .................................. *G01H 9/004* (2013.01)
(58) Field of Classification Search
CPC ...................................................... G01H 9/004

USPC .......................................................... 356/477
See application file for complete search history.

(56) References Cited

U.S. PATENT DOCUMENTS

2016/0349284 A1* 12/2016 Pradhan .................. G01H 9/004
2017/0146400 A1* 5/2017 Zywicki .................... B81B 7/00
2017/0167858 A1* 6/2017 Chen .................... G01B 11/002
2017/0299508 A1* 10/2017 Jin ...................... G02B 6/02328
2018/0135971 A1* 5/2018 Han ....................... G01J 3/0218

* cited by examiner

*Primary Examiner* — Md M Rahman
(74) *Attorney, Agent, or Firm* — PORUS IP LLC

(57) ABSTRACT

Embodiments of the present disclosure relate to the field of acoustic sensing demodulation with high signal-to-noise ratio, real-time demodulation, and high sensitivity, and in particular, to a parallel sensing and demodulation system for acoustic waves based on dual optical frequency combs. The present disclosure introduces dual optical frequency combs as multi-path parallel input light sources, leveraging features of the dual optical frequency combs including narrow linewidth, stable power, high sensitivity, and the capability of precisely converting signals from the optical domain to the radio frequency domain, so the dual optical frequency combs can be used as multi-channel parallel input light sources for acoustic array detection. Besides, some embodiments of the present disclosure employ three-wavelength adaptive demodulation technology to ensure that the detection of acoustic wave signals at every moment has a high signal-to-noise ratio and improved sensitivity for detecting weak signals.

9 Claims, 6 Drawing Sheets

1

PARALLEL SENSING AND DEMODULATION SYSTEMS FOR ACOUSTIC WAVES BASED ON DUAL OPTICAL FREQUENCY COMBS

CROSS-REFERENCE TO RELATED APPLICATIONS

The present disclosure claims priority to Chinese Application No. 202310875225.0, filed on Jul. 17, 2023, the entire contents of which are incorporated herein by reference.

TECHNICAL FIELD

The present disclosure relates to the field of acoustic sensing demodulation with high signal-to-noise ratio, real-time demodulation, and high sensitivity, and in particular, to a parallel sensing and demodulation system for acoustic waves based on dual optical frequency combs.

BACKGROUND

Acoustic sensing is a technology that utilizes the properties of acoustic waves for measurement, detection, and control. It may receive, process, and analyze acoustic wave signals to obtain required information and is widely used in noise control, sound recognition, object ranging, non-destructive testing, etc. Common acoustic sensors include microphones, sonar, ultrasonic sensors, or surface acoustic wave sensors, which can convert the acoustic wave signals into electrical signals or other forms of signals, and then extract the required information through signal processing techniques. Acoustic sensing has a wide range of applications in various fields, such as industry, medicine, and security.

In the field of acoustic sensing, a fiber optic microphone is a type of sound pickup device based on fiber optic sensing technology, which possesses unparalleled sensitivity compared to traditional microphones and can excellently perform monitoring tasks in various harsh electromagnetic environments. Evolved from the Fabry-Perot interferometer, the fiber optic Fabry-Perot interferometric sensor has become a typical representative of fiber optic microphones due to its small size, high stability, and resistance to electromagnetic interference and been applied in various sensing fields such as civil structure detection, biomedical, and energy. A principle of the fiber optic Fabry-Perot interferometric sensor is creating two reflective surfaces within an optical fiber, the light emitted by a light source may be reflected on the two surfaces. Then the two reflected beams of light may meet upon returning and form an interference signal. The reflected interferometric light signal is related to a length L and a refractive index N of the cavity, and when the external measured acoustic parameters act on the sensor, the L and N of the cavity change, which leads to the intensity of the reflected interferometric light signal changes. The change in light density may be detected by the photodetector and information of the measured acoustic wave signal may be obtained based on further demodulation processing.

In order to solve the problem of temperature drift and unstable demodulation signals in the demodulation of optical signals, for the fiber optic Fabry-Perot interferometric sensor, a three-wavelength adaptive demodulation manner may be used. In a single demodulation path, three optical pulses with wavelengths spaced apart (free spectral range) simultaneously enter the Fabry-Perot cavity as light sources. Then the group with the highest signal-to-noise ratio in the spectral data from demodulating the three wavelengths is further processed. This demodulation manner ensures that the demodulation signals do not appear fading or distorted, and the operating point is always in the approximately linear region.

Since an amplified spontaneous emission (ASE) light source has the characteristics of easy integration, high output power, stable output, and simple operation, it is commonly used as the light source of the fiber optic Fabry-Perot interferometric sensors, which makes the sensors have a greater improvement than traditional acoustic sensors in the aspects of positioning accuracy, point sensing, etc. However, the combination of an ASE light source and the fiber optic Fabry-Perot interferometric sensors still has some problems: first, a spectral width of the ASE light source is narrow and has low utilization of the wavelength. According to the three-wavelength adaptive demodulation algorithm, the power efficiency of optical pulses filtered through Wavelength Division Multiplexing (WDM) from the ASE light source is low, typically only about 10-20 µW. Second, due to a large line width and low detection sensitivity, such a combination results in low positioning accuracy when being applied to an acoustic array. Third, since a light spot detector may only detect one path of light Fabry-Perot interferometric sensors, the number of the photodetectors will multiply when using parallel sensing and demodulation through multiple paths, which seriously limits the application of the ASE light source in scenarios that require acoustic positioning accuracy, high signal-to-noise ratio and high-capacity.

Therefore, there is a need to provide a parallel sensing and demodulation system for acoustic waves based on dual optical frequency combs that realizes real-time demodulation with a high signal-to-noise ratio and high sensitivity.

SUMMARY

Some embodiments of the present disclosure provide a parallel sensing and demodulation system for acoustic waves based on dual optical frequency combs, comprising: a first optical frequency comb, a tunable filter, a fiber optic Fabry-Perot interferometric sensor array, a first fiber optic coupler, a second optical frequency comb, a second fiber optic coupler, an optical pre-amplifier, a fiber optic attenuator, a photodetector, a data acquisition card, and a computer, where the tunable filter may be configured to use a pulse sequence of the first optical frequency comb as an incident light source for wavelength selection, split the incident light source into m beams of light, and input each of the beams of light into a corresponding fiber optic Fabry-Perot interferometric sensor of the fiber optic Fabry-Perot interferometric sensor array, respectively; each of the beams of light may consist of comb peaks with three different wavelengths, $$m \in 1,$$

$$\left\lfloor \frac{\min\{f_{r1}, f_{r2}\}}{\Delta f_r} \right\rfloor,$$

$$m \le N;$$

where $f_{r1}$ may denote a repetition frequency of the first optical frequency comb, $f_{r2}$ may denote a repetition frequency of the second optical frequency comb, $\Delta f_r$ may denote a difference in repetition frequency between the first optical frequency comb and the second optical frequency comb, N may denote a count of comb peaks of the first optical frequency comb, the difference in repetition frequency $\Delta f_r = f_{r1} - f_{r2}| > 2f_a$, where $f_a$ may denote a frequency of an acoustic wave signal; the repetition frequency $f_{r1}$ of the first optical frequency comb and the repetition frequency $f_{r2}$ of the second optical frequency comb may be in a range of 20 GHz to 500 GHz; the fiber optic Fabry-Perot interferometric sensor array may include m parallel branches, each of the branches may include a fiber optic circulator and the fiber optic Fabry-Perot interferometric sensor, a Fabry-Perot cavity of the fiber optic Fabry-Perot interferometric sensor may be configured to receive the acoustic wave signal; the fiber optic Fabry-Perot interferometric sensor array may be configured as follows: each of the branches may correspond to each of the beams of light, the each of the beams of light may be injected into the fiber optic Fabry-Perot interferometric sensor from a first port of the fiber optic circulator, and a demodulated interferometric optical signal that changes in light intensity as the Fabry-Perot cavity receives the acoustic wave signal may be output through a third port of the fiber optic circulator; the first fiber optic coupler may be configured to couple the demodulated interferometric optical signal output from each of the branches of the fiber optic Fabry-Perot interferometric sensor array to form a merging beam of light; the second fiber optic coupler may be configured to couple the second optical frequency comb with the merging beam of light; the optical pre-amplifier may be configured to amplify an optical signal coupled by the second fiber optic coupler; the fiber optic attenuator may be configured to regulate an optical power of an optical signal amplified by the optical pre-amplifier; the photodetector may be configured to obtain an analog electrical signal by detecting a beat frequency signal output from the fiber optic attenuator; the fiber optic Fabry-Perot interferometric sensor array may be further configured to number comb peaks of the first optical frequency comb and the second optical frequency comb, with a pumping optical comb tooth peak being numbered as 0 and comb peaks whose frequencies are smaller than the pumping optical comb tooth peak being numbered as $-1, -2, \ldots, -N+1, -N$, and comb peaks whose frequencies are greater than the pumping optical comb tooth peak being numbered as $1, 2, \ldots, N-1, N$; frequencies of a n-th comb peak of the first optical frequency comb and the second optical frequency comb peak may be denoted as $f_{n1} = f_{01} + nf_{r1}$ and $f_{n2} = f_{02} + nf_{r2}$, respectively, and $\in [1, N]$; $f_{01}$ may denote a center frequency of the first optical frequency comb and $f_{02}$ may denote a center frequency of the second optical frequency comb, and $\Delta f_0$ may denote a difference in center frequency between the first optical frequency comb and the second optical frequency comb, and an intensity of the first optical frequency comb may be demodulated based on the acoustic wave signal received by the fiber optic Fabry-Perot interferometric sensor array, and a frequency of an intensity-demodulated signal may be $f_{n1} \pm f_a$, where $f_{n1} = f_{01} + nf_{r1}$; the second fiber optic coupler may be further configured to couple the intensity-demodulated signal with the second optical frequency comb, and a frequency of the second optical frequency comb may be denoted as $f_{n2}$, where $f_{n2} = f_{02} + nf_{r2}$; the data acquisition card may be configured to acquire a coupled signal to obtain a set of intensity-demodulated signals with a center frequency of $\Delta f_0 \pm m\Delta f_r$ and a sideband of $f_a$, i.e., $(\Delta f_0 \pm m\Delta f_r) \pm f_a$, where $f_r = |f_{r1} - f_{r2}| \neq 0$, and convert the analog electrical signal outputted from the photodetector into a digital signal and transmit the digital signal to the computer, and the computer may be configured to perform a three-wavelength adaptive demodulation data processing on the digital signal;

In some embodiments of the present disclosure, the first optical frequency comb and the second optical frequency comb may be on-chip microcavity Kerr optical frequency combs, and the difference in repetition frequency $\Delta f_r$ between the first optical frequency comb and the second optical frequency comb is in a range of 1 MHz to 200 MHz;

In some embodiments of the present disclosure, a free spectral range (FSR) of the fiber optic Fabry-Perot interferometric sensor may be at least 3 times a comb peak spacing $\Delta\lambda$ of the first optical frequency comb, and the free spectral range of the fiber optic Fabry-Perot interferometric sensor may be smaller than an overlapping spectral range of the first optical frequency comb and the second optical frequency comb, and the free spectral range of the fiber optic Fabry-Perot interferometric sensor may be in a range of 2 nm to 30 nm;

In some embodiments of the present disclosure, the tunable filter may include at least one of a fiber Bragg grating, a wavelength division multiplexing filter, or an optical wavelength selector switch;

In some embodiments of the present disclosure, a bandwidth of the photodetector may be not less than three times the difference in repetition frequency $\Delta f_r$ between the first optical frequency comb and the second optical frequency comb, and a typical value of the bandwidth of the photodetector may be greater than or equal to 10 MHz;

In some embodiments of the present disclosure, a bandwidth of the data acquisition card may be greater than 1 GHz, and a sampling rate of the data acquisition card may be greater than 2 Gs/s;

In some embodiments of the present disclosure, the computer may be further configured to select spectral sequences from the digital signal where wavelengths of three comb peaks differ by ⅓ FSR, calculate signal-to-noise ratios of the spectral sequences, respectively, and select a spectral sequence with a largest signal-to-noise ratio as to-be-demodulated data, where FSR denotes a free spectral range of the fiber optic Fabry-Perot interferometric sensor, and recover the acoustic wave signal by demodulating the to-be-demodulated data.

In some embodiments of the present disclosure, the repetition frequency $f_{r1}$ of the first optical frequency comb and the repetition frequency $f_{r2}$ of the second optical frequency comb may be in a range of 20 GHz to 500 GHz; and In some embodiments of the present disclosure, a wavelength corresponding to a frequency $f_{n1}$ of an n-th comb peak of the first optical frequency comb may be denoted as $\lambda_{n1}$, and a wavelength corresponding to a frequency $f_{n2}$ of the n-th comb peak of the second optical frequency comb may be denoted as $\lambda_{n2}$.

BRIEF DESCRIPTION OF THE DRAWINGS

The present disclosure will be further illustrated by way of exemplary embodiments, which will be described in detail by means of the accompanying drawings. These embodiments are not limiting, and in these embodiments, the same numbering denotes the same structure, where.

Figure 1:
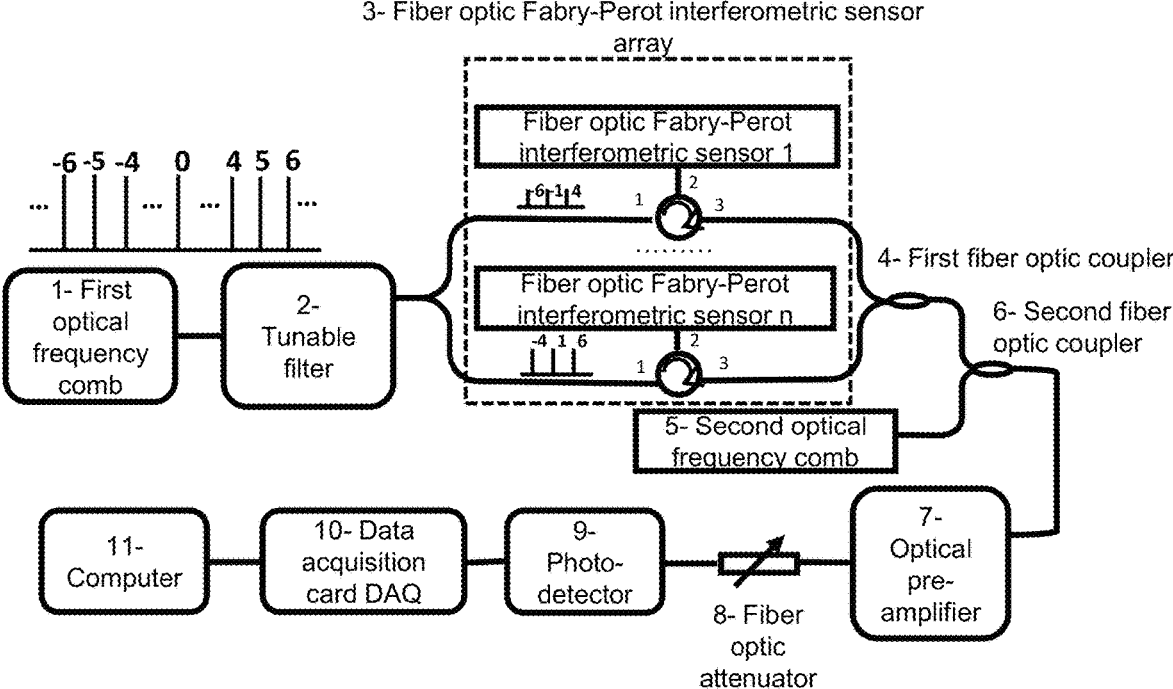
FIG. 1 is a schematic diagram illustrating an exemplary framework of a parallel sensing and demodulation system for acoustic waves based on dual optical frequency combs according to some embodiments of the present disclosure.

Numbers in the figures denote: 1, first optical frequency comb; 2, tunable filter; 3, fiber optic Fabry-Perot interferometric sensor array; 4, first fiber optic coupler; 5, second optical frequency comb; 6, second fiber optic coupler; 7, optical pre-amplifier; 8, fiber optic attenuator; 9, photodetector; 10, data acquisition card; 11, computer.

DETAILED DESCRIPTION

In order to more clearly illustrate the technical solutions of the embodiments of the present disclosure, the accompanying drawings required to be used in the description of the embodiments are briefly described below. Obviously, the accompanying drawings in the following description are only some examples or embodiments of the present disclosure, and it is possible for a person of ordinary skill in the art to apply the present disclosure to other similar scenarios in accordance with these drawings without creative labor. Unless obviously obtained from the context or the context illustrates otherwise, the same numeral in the drawings refers to the same structure or operation.

As shown in the present disclosure and in the claims, unless the context clearly suggests an exception, the words "one," "a", "an," and/or "the" do not specifically refer to the singular, but may also include the plural. Generally, the terms "including" and "comprising" only suggest the inclusion of explicitly identified steps and elements that do not constitute an exclusive list, and the method or apparatus may also include other steps or elements.

FIG. 1 is a schematic diagram illustrating an exemplary framework of a parallel sensing and demodulation system for acoustic waves based on dual optical frequency combs according to some embodiments of the present disclosure.

In order to solve problems that the ASE light source is limited in application scenarios that require acoustic positioning accuracy, high signal-to-noise ratio, and high-capacity, some embodiments of the present disclosure provide the parallel sensing and demodulation system for acoustic waves based on dual optical frequency combs, which can reduce the performance requirements and the number of the photodetector, and can realize parallel acoustic wave array detection in real-time with high sensitivity and high stability while maintaining a high signal-to-noise ratio of demodulation signals.

Referring to FIG. 1, the parallel sensing and demodulation system for acoustic waves based on dual optical frequency combs provided by the present disclosure may comprise: a first optical frequency comb 1, a tunable filter 2, a fiber optic Fabry-Perot interferometric sensor array 3, a first fiber optic coupler 4, a second optical frequency comb 5, a second fiber optic coupler 6, an optical pre-amplifier 7, a fiber optic attenuator 8, a photodetector 9, a data acquisition card 10, and a computer 11.

In some embodiments, the first optical frequency comb 1 may have a repetition frequency, and the repetition frequency of the first optical frequency comb 1 may be denoted as $f_{r1}$. In some embodiments, the tunable filter 2 may be configured to use a pulse sequence of the first optical frequency comb 1 as an incident light source for selecting filtration waves (i.e., wavelength selection), split the incident light source into m beams of light, and input each of the beams of light into a corresponding fiber optic Fabry-Perot interferometric sensor of the fiber optic Fabry-Perot interferometric sensor array 3, respectively. Each of the beams of light may consist of comb peaks with three different wavelengths, $$m \in 1,$$

$$\left\lfloor \frac{\min\{f_{r1}, f_{r2}\}}{\Delta f_r} \right\rfloor,$$

$$m \leq N;$$

A repetition frequency of the second optical frequency comb 5 may be denoted as $f_{r2}$, $\Delta f_r$ may denote a difference in repetition frequency between the first optical frequency comb 1 and the second optical frequency comb 5, N may denote a count of combs of the first optical frequency comb 1, and the difference in repetition frequency $\Delta f_r = |f_{r1} - f_{r2}| > 2f_a$, and $f_a$ may denote a frequency of an acoustic wave signal.

In some embodiments, the repetition frequency $f_{r1}$ of the first optical frequency comb 1 and the repetition frequency $f_{r2}$ of the second optical frequency comb 5 may be in a range of 20 GHz to 500 GHz, e.g., the repetition frequency $f_{r1}$ of the first optical frequency comb 1 and the repetition frequency $f_{r2}$ of the second optical frequency comb 5 may both be around 100 GHz. In some embodiments, the repetition frequency $f_{r1}$ of the first optical frequency comb 1 and the repetition frequency $f_{r2}$ of the second optical frequency comb 5 may also be in a range of 10 GHz to 1000 GHz.

In some embodiments, the tunable filter 2 may include at least one of a fiber Bragg grating (FBG), a wavelength division multiplexing filter (WDM), or an optical wavelength selector switch (WSS).

In some embodiments, the tunable filter 2 may input the m beams of light into each corresponding fiber optic Fabry-Perot interferometric sensor of the fiber optic Fabry-Perot interferometric sensor array 3, respectively. The fiber optic Fabry-Perot interferometric sensor array 3 may include m parallel branches, each of the branches includes a fiber optic circulator and a fiber optic Fabry-Perot interferometric sensor, a Fabry-Perot cavity of the fiber optic Fabry-Perot interferometric sensor may be configured to receive the acoustic wave signal.

In some embodiments, the fiber optic Fabry-Perot interferometric sensor array 3 may be configured as follows: each of the branches may correspond to each of the beams of light, and the beams of light may be injected into the fiber optic Fabry-Perot interferometric sensor via a first port of the fiber optic circulator, and each of the beams of light may be reflected when passing through two reflective surfaces disposed inside the Fabry-Perot cavity, then two reflected lights may meet upon returning and form a demodulated interferometric optical signal that changes in light intensity as the Fabry-Perot cavity receives the acoustic wave signal and the demodulated interferometric optical signal may be output through a third port of the fiber optic circulator;

In some embodiments, the first fiber optic coupler may be configured to couple the demodulated interferometric optical signal output from each branch of the fiber optic Fabry-Perot interferometric sensor array 3 to form a merging beam of light.

In some embodiments, the second fiber optic coupler 6 may be configured to couple the second optical frequency comb 5 with the merging beam of light.

In some embodiments, the optical pre-amplifier 7 may be configured to amplify an optical signal coupled by the second fiber optic coupler 6.

In some embodiments, the fiber optic attenuator 8 may be configured to regulate an optical power of an optical signal amplified by the optical pre-amplifier 7.

In some embodiments, the photodetector 9 may be configured to obtain an analog electrical signal by detecting a beat-frequency signal output from the fiber-optic attenuator 8.

In some embodiments, the fiber optic Fabry-Perot interferometric sensor array 3 may further be configured to number comb peaks of the first optical frequency comb 1 and the second optical frequency comb 5. A pumping optical comb peak may be numbered as 0, and comb peaks whose frequencies are smaller than the pumping optical comb peak may be numbered as $-1, -2, \ldots, -N+1, -N$, and comb peaks whose frequencies are greater than the pumping optical comb peak may be numbered as $1, 2, \ldots, N-1, N$. Frequencies of a n-th comb peak of the first optical frequency comb 1 and a n-th comb peak the second optical frequency comb peak 5 may be denoted as $f_{n1}=f_{01}+nf_{r1}$ and $f_{n2}=f_{02}+n f_{r2}$, respectively, where $f_{n1}$ may correspond to a wavelength $\lambda_{n1}$, and $f_{n2}$ may correspond to a wavelength $\lambda_{n2}$, and $n\in[1, N]$. $f_{01}$ may denote a center frequency of the first optical frequency comb 1 and $f_{02}$ may denote a center frequency of the second optical frequency comb 5, and a difference in center frequency between the first optical frequency comb 1 and the second optical frequency comb 5 may be denoted $\Delta f_0$. In some embodiments, more detailed content about the numbering the comb peak numbering may be found in FIG. 3 and descriptions thereof.

In some embodiments, the fiber optic Fabry-Perot interferometric sensor array 3 may modulate an intensity of the first optical frequency comb 1 based on the acoustic wave signal received by the fiber optic Fabry-Perot interferometric sensor array 3, and a frequency of an intensity-demodulated signal may be $f_{n1}\pm f_a$, where $f_{n1}=f_{01}+nf_{r1}$;

In some embodiments, the second fiber optic coupler 6 may also couple the intensity-demodulated signal with the second optical frequency comb 5, and a frequency of the second optical frequency comb 5 may be denoted as $f_{n2}$, where $f_{n2}=f_{n2}+nf_{r2}$.

The data acquisition card 10 may be configured to acquire a coupled signal to obtain a set of intensity-demodulated signals with a center frequency of $\Delta f_0\pm m\Delta f_r$ and a sideband of $f_a$, i.e., $(\Delta f_0\pm m\Delta f_r)\pm f_a$, where $\Delta f_r=|f_{r1}-f_{r2}|\neq0$.

In some embodiments, the data acquisition card 10 may convert an analog electrical signal output from the photodetector 9 to a digital signal, and finally transmit the digital signal to the computer 11. In some embodiments, the computer 11 may be configured to perform a three-wavelength adaptive demodulation data processing on the digital signal.

Some embodiments in the present disclosure introduce dual optical frequency combs (i.e., the first optical frequency comb 1 and the second optical frequency comb 5) in a traditional sensing and demodulation system for acoustic waves and utilize the optical frequency comb as a natural medium of an "optical-electrical" bridge. By using the first optical frequency comb 1 as a "signal comb" and the second optical frequency comb 5 with a small difference in repetition frequency as a "reference comb," and beating the two combs together, a frequency difference may be utilized to generate a high-precision clock signal, achieving simultaneous conversion of multiple measured information from optical domains to radio frequency domains. This significantly reduces the bandwidth requirements for the photodetector 9 and the number of devices, and lowers costs and system complexity.

The scheme provided in the present disclosure abandons the traditional manner of using the ASE light source as an input light source, and by employing dual optical frequency combs and utilizing their characteristics of wavelength at equal intervals, narrow linewidth, and broad spectral width, they can be used for multi-path output in parallel. Through coherent beating, information may be transformed from an optical domain to a radio frequency domain, greatly reducing the cost and complexity of devices, which is beneficial for applications of acoustic array positioning. Additionally, using the three-wavelength adaptive demodulation eliminates the effects of demodulation signal fading or distorted caused by interference fringe drift, reduces the system cost and the hardware noise of the system itself, and improves the signal-to-noise ratio of the demodulation signal, thereby making the detection of a change in intensity of acoustic waves more sensitive.

Figure 2A:
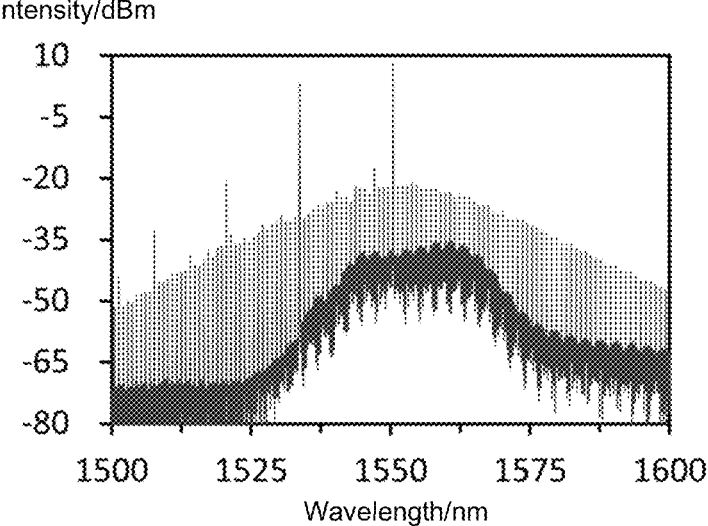
FIG. 2a is a schematic diagram illustrating a spectrogram of a first optical frequency comb according to some embodiments of the present disclosure.
Figure 2B:
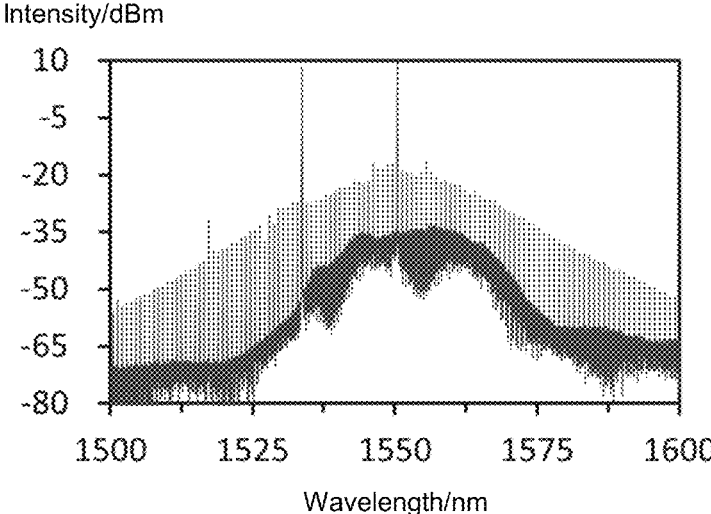
FIG. 2*b* is a schematic diagram illustrating a spectrogram of a second optical frequency comb according to some embodiments of the present disclosure.

FIG. 2a is a diagram illustrating a spectrogram of the first optical frequency comb 1 according to some embodiments of the present disclosure. FIG. 2b is a diagram illustrating a spectrogram of the second optical frequency comb 5 according to some embodiments of the present disclosure. In the figures, horizontal coordinates represent a wavelength in nm and vertical coordinates represent an intensity in dBm.

In some embodiments, the first optical frequency comb 1 and the second optical frequency comb 5 may be an on-chip microcavity Kerr optical frequency comb. A micro-resonator material of the first optical frequency comb 1 and/or the second optical frequency comb 5 may be silicon nitride (such as $Si_3N_4$), serving as an on-chip Kerr frequency comb generator, and compared to other optical frequency combs, the silicon nitride may have advantages of a simple structure, a higher power, and a more stable power.

The difference in repetition frequency $\Delta f_r$ being too small may result in aliasing of frequencies of acoustic wave signals, while the difference in repetition frequency $\Delta f_r$ being too large may render the detection failure of the photodetector 9. In some embodiments, the difference in repetition frequency $\Delta f_r$ between the first optical frequency comb 1 and the second optical frequency comb 5 may be in a range of 1 MHz to 200 MHz. In some embodiments, the difference in repetition frequency $\Delta f_r$ between the first optical frequency comb 1 and the second optical frequency comb 5 may be in a range of 0.1 MHz to 300 MHz.

Referring to FIG. 2a and FIG. 2b, for example, assuming that a center wavelength of the first optical frequency comb 1 and the second optical frequency comb 5 is 1550 nm, respectively, the repetition frequency $f_{r1}$ of the first optical frequency comb 1 is 100.0104 GHz, and the repetition frequency $f_{r2}$ of the second optical frequency comb 5 is 100.0352 GHz, then the difference in repetition frequency $\Delta f_r$ may be 25.1 MHz, and the difference in center frequency between the first optical frequency comb 1 and the second optical frequency comb 5 $\Delta f_0$ may be 200 MHz.

Figure 3:
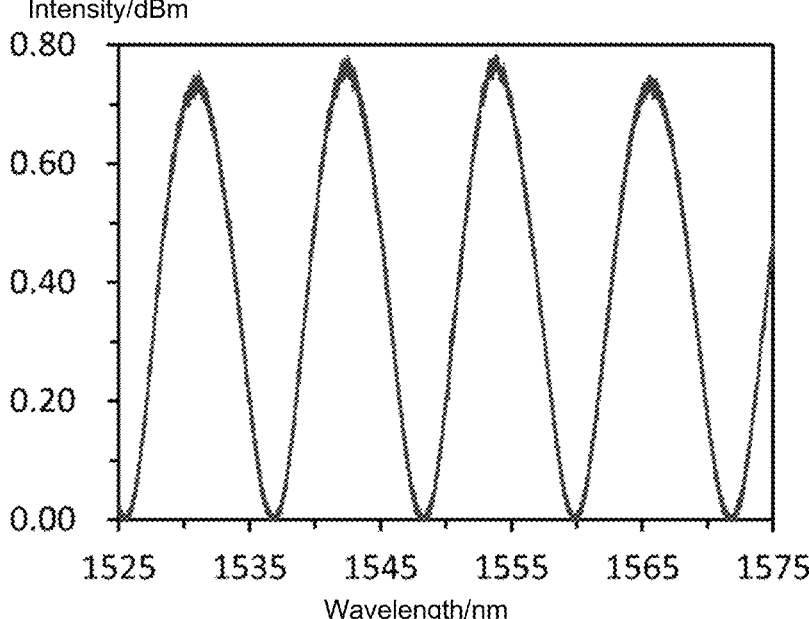
FIG. 3 is a schematic diagram illustrating a reflection spectrum of a fiber optic Fabry-Perot interferometric sensor according to some embodiments of the present disclosure.

FIG. 3 is a diagram illustrating a reflectance spectrum of a fiber optic Fabry-Perot interferometric sensor according to some embodiments of the present disclosure. In the figure, horizontal coordinates represent a wavelength in nm and vertical coordinates represent an intensity in dBm. Referring to FIG. 3, according to a power of the optical frequency comb and the Fabry-Perot characteristics, a length of a selected Fabry-Perot cavity may be 12.6 nm. For example, a pumping optical comb peak numbered as 0 of the first optical frequency comb may be selected as a center, and 6 comb peaks on each side of the center may be selected, the 6 comb peaks on each side of the center being numbered from −6 to 6 from the smallest to the largest. Then, certain comb peaks may be selected and divided into 3 groups, specifically, comb peaks numbered −6, −1, and 4 may be divided into a first group, comb peaks numbered −5, 0, and 5 may be divided into a second group, and comb peaks numbered −4, 1, and 6 may be divided into a third group. Then, the three groups may enter into three Fabry-Perot cavities, respectively, and a reflection spectrum shown in FIG. 3 may be obtained.

In some embodiments, a free spectral range (FSR) of the fiber optic Fabry-Perot interferometric sensor may be at least three times a comb peak spacing $\Delta\lambda$ of the first optical frequency comb 1 and the FSR of the fiber optic Fabry-Perot interferometric sensor may be less than an overlapping spectral range of the first optical frequency comb 1 and the second optical frequency comb 5, to ensure the accuracy of the system.

The FSR of the fiber optic Fabry-Perot interferometric sensor may be in a range of 2 nm to 30 nm. In some embodiments, the FSR of the fiber optic Fabry-Perot interferometric sensor may be 7 nm or 15 nm. In some embodiments, the FSR of the fiber optic Fabry-Perot interferometric sensor may be in a range of 2 nm to 30 nm.

In order to ensure the measurement effect, a bandwidth of the photodetector 9 may be sufficiently large. Therefore, in some embodiments, the bandwidth of the photodetector 9 may be not less than three times the difference in repetition frequency $\Delta f_r$ (e.g., five times the difference in repetition frequency $\Delta f_r$, or ten times the difference in repetition frequency $\Delta f_r$, etc.) between the first optical frequency comb 1 and the second optical frequency comb 5, and a typical value of the bandwidth of the photodetector 9 may be greater than or equal to 10 MHz. Exemplarily, the bandwidth of the photodetector 9 may be 350 MHz.

In some embodiments, a bandwidth of the data acquisition card 10 may be greater than or equal to 1 GHz, and a sampling rate of the data acquisition card 10 may be greater than or equal to 2 Gs/s. In order to obtain a higher resolution, and thus obtain a better demodulation effect, in some embodiments, the bandwidth of the data acquisition card 10 may be 2 GHz and the sampling rate of the data acquisition card 10 may be 5 Gs/s, and an oscilloscope with a bandwidth of 1 GHz and a maximum sampling rate of 5 Gs/s may be employed.

In some embodiments, a time-domain waveform may be obtained by the data acquisition card 10 and displayed on a frequency analyzer as a periodic frequency sequence with $\Delta f_0$ as a center frequency and $\Delta f_r$ as a frequency period, and a frequency sequence within each period is centered around $N*\Delta f_r$, with sidebands demodulated by a sound wave signal. An amplitude of an optical signal may be demodulated by an external acoustic wave signal at frequency $f_a$. According to Fourier transform, this demodulation may create sidebands spaced by $f_a$ on two sides of the optical signal frequency in the spectrum. By detecting these demodulation sidebands of the optical signal, the frequency of the acoustic wave signal may be obtained.

Figure 4:
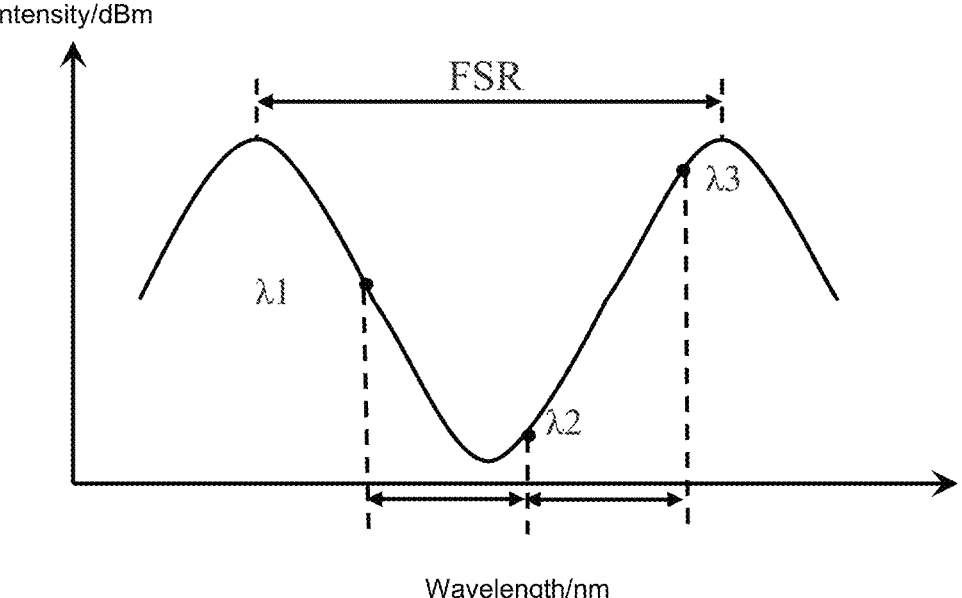
FIG. 4 is a schematic diagram illustrating an exemplary principle of three-wavelength adaptive demodulation according to some embodiments of the present disclosure.

FIG. 4 is a schematic diagram illustrating an exemplary principle of three-wavelength adaptive demodulation according to some embodiments of the present disclosure. In the figure, horizontal coordinates denote a wavelength in nm and vertical coordinates denote an intensity in dBm.

To ensure the demodulation effect and to improve a signal-to-noise ratio of the acoustic wave signal, in some embodiments, the computer 11 may perform a three-wavelength adaptive demodulation data processing, including: selecting spectral sequences from the digital signal where wavelengths of three comb peaks differ by ⅓·FSR, calculating signal-to-noise ratios of the spectral sequences, respectively, and select a spectral sequence with a largest signal-to-noise ratio as to-be-demodulated data, and recovering the acoustic wave signal by demodulating the to-be-demodulated data.

FSR denotes a free spectral range of the fiber optic Fabry-Perot interferometric sensor, and the range of the free spectral range may be referred to the previous relevant description, and demodulation is a conventional data processing manner, which may be repeatedly described in the present disclosure.

Figure 5A:
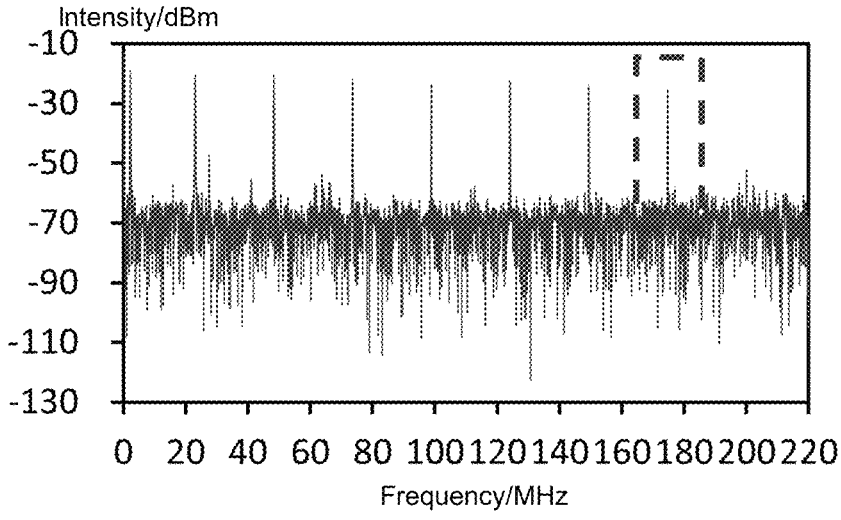
FIG. 5*a* is a schematic diagram illustrating a spectrogram of an experimental result being applied an acoustic wave signal of 10 kHz according to some embodiments of the present disclosure.
Figure 5B:
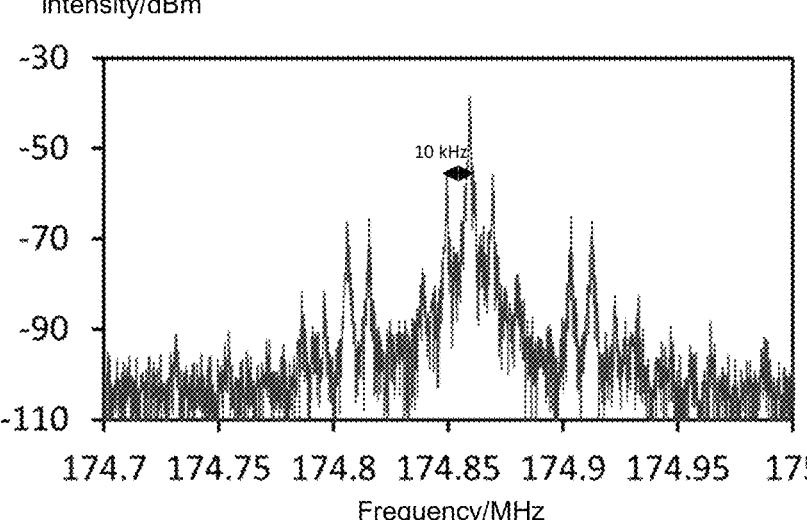
FIG. 5*b* is a schematic diagram illustrating a localized enlarged view of the spectrum shown in FIG. 5*a* at a center frequency of 174.856 MHz.
Figure 5C:
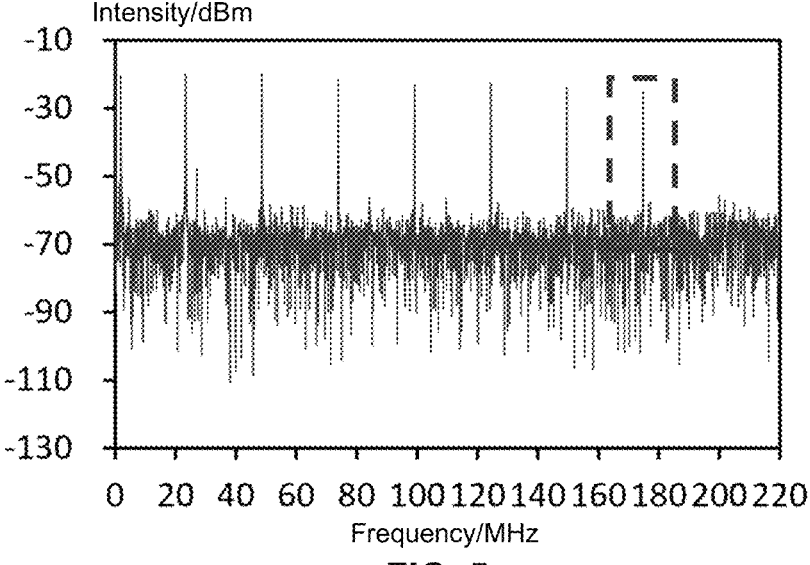
FIG. 5*c* is a schematic diagram illustrating a spectrogram of an experimental result without being applied to an acoustic wave signal according to some embodiments of the present disclosure.
Figure 5D:
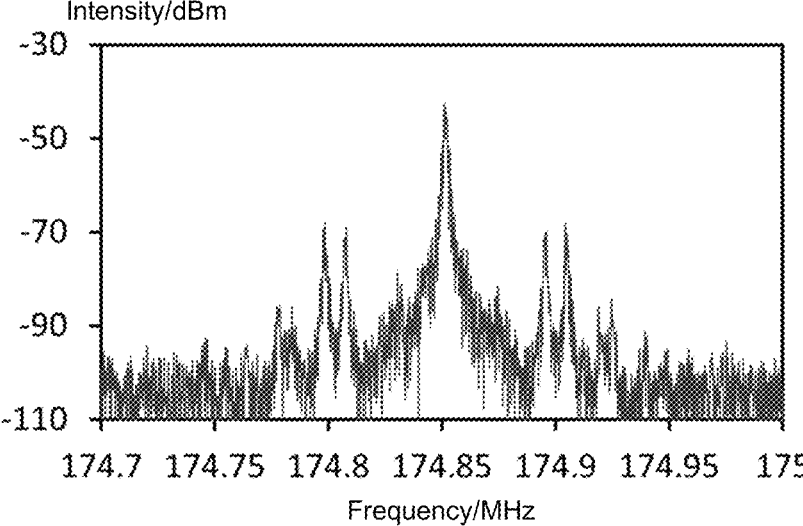
FIG. 5*d* is a schematic diagram illustrating a localized enlarged view of the spectrum shown in FIG. 5*c* at a center frequency of 174.856 MHz.

FIG. 5a and FIG. 5d show a comparison between spectrums with or without being applied an acoustic wave signal according to some embodiments of the present disclosure. In the figures, horizontal coordinates denote a frequency in MHz and vertical coordinates denote an intensity in dBm. FIG. 5a is a diagram illustrating a spectrogram of an experimental result being applied an acoustic wave signal of 10 kHz according to some embodiments of the present disclosure;

FIG. 5b is a schematic diagram illustrating a localized enlarged view of the spectrum shown in FIG. 5a at a center frequency of 174.856 MHz; FIG. 5c is a diagram illustrating a spectrogram of an experimental result without being applied to an acoustic wave signal according to some embodiments of the present disclosure, and FIG. 5d is a schematic diagram illustrating a localized enlarged view of the spectrum shown in FIG. 5c at a center frequency of 174.856 MHz.

Based on FIG. 5a to FIG. 5d, it may be seen that, ultimately, the parallel sensing and demodulation system for acoustic waves based on dual optical frequency combs provided by some embodiments of the present disclosure may have a maximum signal-to-noise ratio of 52 dB. Apart from a great improvement compared to previous sensing and demodulation systems for acoustic waves based on the ASE light source, in some embodiments, the parallel sensing and demodulation system for acoustic waves based on dual optical frequency combs adopted a three-wavelength adaptive demodulation algorithm may also be applied to acoustic wave parallel sensing arrays, which reduces the complexity and cost of acoustic positioning devices, and has high signal-to-noise ratio, high sensitivity, high stability and can achieve multi-path parallelism.

As can be seen from the above embodiments, some of the embodiments of the present disclosure abandon using the ASE light source as the input light source by introducing dual optical frequency combs into a traditional optical acoustic sensing system. Instead, dual optical frequency combs may be used as multi-path parallel input light sources, leveraging features of the dual optical frequency combs including narrow linewidth, stable power, high sensitivity, and the capability of precisely conversing signals from the optical domain to the radio frequency domain, which enables accurate detection of acoustic wave signals. Therefore, the dual optical frequency combs may be used as multi-channel parallel input light sources for acoustic array detection. Besides, some embodiments of the present disclosure employ three-wavelength adaptive demodulation technology to ensure the detection of acoustic wave signals at every moment has a high noise-to-signal ratio and improved sensitivity when detecting weak signals. The disclosed has advantages of anti-electromagnetic interference, high sensitivity, real-time demodulation, and multi-path parallel array detection, which effectively solves the problems of large linewidth of the light source, inability to be input by multi-path in parallel, and low utilization of the light source in traditional optical acoustic sensors.

The basic concepts have been described above, and it is apparent to those skilled in the art that the foregoing detailed disclosure serves only as an example and does not constitute a limitation of the present disclosure. While not expressly stated herein, a person skilled in the art may make various modifications, improvements, and amendments to the present disclosure. Those types of modifications, improvements, and amendments are suggested in the present disclosure, so those types of modifications, improvements, and amendments remain within the spirit and scope of the exemplary embodiments of the present disclosure.

Also, the present disclosure uses specific words to describe embodiments of the present disclosure. Such as "one embodiment", "an embodiment", and/or "some embodiments" mean a feature, structure, or characteristic associated with at least one embodiment of the present disclosure. Accordingly, it should be emphasized and noted that two or more references in the present disclosure at different locations to "one embodiment", "an embodiment" or "an alternative embodiment" do not necessarily refer to the same embodiment. In addition, certain features, structures, or characteristics of one or more embodiments of the present disclosure may be suitably combined.

Similarly, it should be noted that in order to simplify the presentation of the disclosure of the present disclosure, and thereby aid in the understanding of one or more embodiments of the invention, the foregoing descriptions of embodiments of the present disclosure sometimes combine a variety of features into a single embodiment, accompanying drawings, or descriptions thereof. However, this method of disclosure does not imply that more features are required for the objects of the present disclosure than are mentioned in the claims. Rather, claimed subject matter may lie in less than all features of a single foregoing disclosed embodiment.

Finally, it should be understood that the embodiments described in the present disclosure are only used to illustrate the principles of the embodiments of the present disclosure. Other deformations may also fall within the scope of the present disclosure. As such, alternative configurations of embodiments of the present disclosure may be considered to be consistent with the teachings of the present disclosure as an example, not as a limitation. Correspondingly, the embodiments of the present disclosure are not limited to the embodiments expressly presented and described herein.

What is claimed is:

1. A parallel sensing and demodulation system for acoustic waves based on dual optical frequency combs, comprising: a first optical frequency comb, a tunable filter, a fiber optic Fabry-Perot interferometric sensor array, a first fiber optic coupler, a second optical frequency comb, a second fiber optic coupler, an optical pre-amplifier, a fiber optic attenuator, a photodetector, a data acquisition card, and a computer, wherein, the tunable filter is configured to use a pulse sequence of the first optical frequency comb as an incident light source for wavelength selection, split the incident light source into m beams of light, and input each of the beams of light into a corresponding fiber optic Fabry-Perot interferometric sensor of the fiber optic Fabry-Perot interferometric sensor array, respectively; each of the beams of light consists of comb peaks with three different wavelengths $$m \in 1,$$
$$\left\lfloor \frac{\min\{f_{r1}, f_{r2}\}}{\Delta f_r} \right\rfloor,$$
$$m \leq N;$$

wherein $f_{r1}$ denotes a repetition frequency of the first optical frequency comb, $f_{r2}$ denotes a repetition frequency of the second optical frequency comb, $\Delta f_r$ denotes a difference in repetition frequency between the first optical frequency comb and the second optical frequency comb, N denotes a count of comb peaks of the first optical frequency comb, the difference in repetition frequency $\Delta f_r = |f_{r1} - f_{r2}| > 2f_a$, wherein $f_a$ denotes a frequency of an acoustic wave signal; the repetition frequency $f_{r1}$ of the first optical frequency comb and the repetition frequency $f_{r2}$ of the second optical frequency comb are in a range of 20 GHz to 500 GHz;

the fiber optic Fabry-Perot interferometric sensor array includes m parallel branches, each of the branches includes a fiber optic circulator and the fiber optic Fabry-Perot interferometric sensor, a Fabry-Perot cavity of the fiber optic Fabry-Perot interferometric sensor is configured to receive the acoustic wave signal; the fiber optic Fabry-Perot interferometric sensor array is configured as follows: each of the branches corresponds to each of the beams of light, each of the beams of light is injected into the fiber optic Fabry-Perot interferometric sensor from a first port of the fiber optic circulator, and a demodulated interferometric optical signal that changes in light intensity as the Fabry-Perot cavity receives the acoustic wave signal is output through a third port of the fiber optic circulator;

the first fiber optic coupler is configured to couple the demodulated the interferometric optical signal output from each of the branches of the fiber optic Fabry-Perot interferometric sensor array to form a merging beam of light;

the second fiber optic coupler is configured to couple the second optical frequency comb with the merging beam of light;

the optical pre-amplifier is configured to amplify an optical signal coupled by the second fiber optic coupler;

the fiber optic attenuator is configured to regulate an optical power of an optical signal amplified by the optical pre-amplifier;

the photodetector is configured to obtain an analog electrical signal by detecting a beat frequency signal output from the fiber optic attenuator;

the fiber optic Fabry-Perot interferometric sensor array is further configured to number comb peaks of the first optical frequency comb and the second optical frequency comb, with a pumping optical comb peak being numbered as 0 and comb peaks whose frequencies are smaller than the pumping optical comb peak being numbered as $-1$, $-2$, . . . , $-N+1$, $-N$, and comb peaks whose frequencies are greater than the pumping optical comb peak being numbered as 1, 2, . . . $N-1$, $N$; frequencies of a n-th comb peak of the first optical frequency comb and the second optical frequency comb peak are denoted as $f_{n1}=f_{01}+nf_{r1}$ and $f_{n2}=f_{02}+nf_{r2}$, respectively, and $n \in [1, N]$; $f_{01}$ denotes a center frequency of the first optical frequency comb and $f_{02}$ denotes a center frequency of the second optical frequency comb; and $\Delta f_0$ denotes a difference in center frequency between the first optical frequency comb and the second optical frequency comb; and an intensity of the first optical frequency comb is demodulated based on the acoustic wave signal received by the fiber optic Fabry-Perot interferometric sensor array, and a frequency of an intensity-demodulated signal is $f_{n1} \pm f_a$, wherein $f_{n1}=f_{01}+nf_{r1}$;

the second fiber optic coupler is further configured to couple the intensity-demodulated signal with the second optical frequency comb, and a frequency of the second optical frequency comb is denoted as $f_{n2}$, wherein $f_{n2}=f_{02}+nf_{r2}$;

the data acquisition card is configured to acquire a coupled signal to: obtain a set of intensity-demodulated signals with a center frequency of $\Delta f_0 \pm m\Delta f_r$ and a sideband of $f_a$, i.e., $(\Delta f_0 \pm m\Delta f_r) \pm f_a$, wherein $\Delta f_r = |f_{r1} - f_{r2}| \neq 0$, and convert the analog electrical signal outputted by the photodetector into a digital signal and transmit the digital signal to the computer; and the computer is configured to perform a three-wavelength adaptive demodulation data processing on the digital signal.

2. The system of claim 1, wherein the first optical frequency comb and the second optical frequency comb are on-chip microcavity Kerr optical frequency combs, and the difference in repetition frequency $\Delta f_r$ between the first optical frequency comb and the second optical frequency comb is in a range of 1 MHz to 200 MHz.

3. The system of claim 1, wherein a free spectral range (FSR) of the fiber optic Fabry-Perot interferometric sensor is at least 3 times a comb peak spacing $\Delta \lambda$ of the first optical frequency comb, and the free spectral range of the fiber optic Fabry-Perot interferometric sensor is smaller than an overlapping spectral range of the first optical frequency comb and the second optical frequency comb, and the free spectral range of the fiber optic Fabry-Perot interferometric sensor is in a range of 2 nm to 30 nm.

4. The system of claim 1, wherein the tunable filter includes at least one of a fiber Bragg grating, a wavelength division multiplexing filter, or an optical wavelength selector switch.

5. The system of claim 1, wherein a bandwidth of the photodetector is not less than three times the difference in repetition frequency $\Delta f_r$ between the first optical frequency comb and the second optical frequency comb, and a typical value of the bandwidth of the photodetector is greater than 10 MHz.

6. The system of claim 1, wherein a bandwidth of the data acquisition card is greater than 1 GHz, and a sampling rate of the data acquisition card is greater than 2 Gs/s.

7. The system of claim 1, wherein the computer is further configured to:

select spectral sequences from the digital signal where wavelengths of three comb peaks differ by ⅓·FSR, calculate signal-to-noise ratios of the spectral sequences, respectively, and select a spectral sequence with a largest signal-to-noise ratio as to-be-demodulated data, wherein FSR denotes a free spectral range of the fiber optic Fabry-Perot interferometric sensor; and recover the acoustic wave signal by demodulating the to-be-demodulated data.

8. The system of claim 1, wherein the repetition frequency $f_{r1}$ of the first optical frequency comb and the repetition frequency $f_{r2}$ of the second optical frequency comb are in a range of 20 GHz to 500 GHz.

9. The system of claim 1, wherein a wavelength corresponding to a frequency $f_{n1}$ of an n-th comb peak of the first optical frequency comb is denoted as $\lambda_{n1}$, and a wavelength corresponding to a frequency $f_{n2}$ of the n-th comb peak of the second optical frequency comb is denoted as $\lambda_{n2}$.

* * * * *